(12) United States Patent
Lu

(10) Patent No.: US 11,270,045 B2
(45) Date of Patent: Mar. 8, 2022

(54) QUANTITATIVE MATCHING DESIGN METHOD FOR STRUCTURE HEAT TREATMENT-HARDNESS DISTRIBUTION

(71) Applicant: UNIVERSITY OF SHANGHAI FOR SCIENCE AND TECHNOLOGY, Shanghai (CN)

(72) Inventor: Xi Lu, Shanghai (CN)

(73) Assignee: University of Shanghai for Science and Technology, Shanghai (CN)

(*) Notice: Subject to any disclaimer, the term of this patent is extended or adjusted under 35 U.S.C. 154(b) by 110 days.

(21) Appl. No.: 16/964,622

(22) PCT Filed: Mar. 13, 2020

(86) PCT No.: PCT/CN2020/079198
§ 371 (c)(1),
(2) Date: Jul. 24, 2020

(87) PCT Pub. No.: WO2021/004083
PCT Pub. Date: Jan. 14, 2021

(65) Prior Publication Data
US 2022/0043947 A1 Feb. 10, 2022

(30) Foreign Application Priority Data
Jul. 11, 2019 (CN) .......................... 201910623537.6

(51) Int. Cl.
*G06F 30/20* (2020.01)
*G06F 30/17* (2020.01)
(Continued)

(52) U.S. Cl.
CPC .............. *G06F 30/20* (2020.01); *G06F 30/17* (2020.01); *G06F 30/13* (2020.01); *G06F 2101/00* (2013.01); *G06F 2119/14* (2020.01)

(58) Field of Classification Search
CPC .......... G06F 30/20; G06F 30/17; G06F 30/13; G06F 2119/14; G06F 1201/00
(Continued)

(56) References Cited

U.S. PATENT DOCUMENTS

| 5,619,135 A * | 4/1997 | Kohn ....................... G01B 7/06 |
| | | 324/239 |
| 10,309,883 B2 * | 6/2019 | Rassaian ................ G01N 29/12 |

(Continued)

FOREIGN PATENT DOCUMENTS

| CN | 105302955 | 2/2016 |
| CN | 107904393 | 4/2018 |

(Continued)

OTHER PUBLICATIONS

International Search Report in PCT/CN2020/079198, issued by ISA, dated Jun. 15, 2020.

(Continued)

Primary Examiner — Phallaka Kik
(74) Attorney, Agent, or Firm — Zhu Lehnhoff LLP

(57) ABSTRACT

Aiming at a hardness mismatch phenomenon in the existing structure hardness design process according to an integral intensity viewpoint, the invention provides a quantitative matching design method for structure heat treatment-hardness distribution. The specific method comprises determining an ideal static intensity field distribution of the dangerous section of the structure according to a limit static stress distribution of a dangerous section of the structure; determining an ideal hardness distribution of the dangerous section of the structure by utilizing an intensity-hardness conversion relation; determining heat treatment requirements such as surface hardness, core hardness and the like by combining material and heat treatment mode; determining an actual hardness distribution of the dangerous section (Continued)

of the structure according to a material end quenching curve and the heat treatment requirement.

5 Claims, 3 Drawing Sheets

(51) Int. Cl.
    *G06F 30/13*     (2020.01)
    *G06F 119/14*     (2020.01)

(58) Field of Classification Search
    USPC ............... 703/7, 1; 702/42, 44, 105, 113
    See application file for complete search history.

(56) References Cited

U.S. PATENT DOCUMENTS

| | | | |
|---|---|---|---|
| 2010/0235110 A1* | 9/2010 | Wang | G06F 30/20 |
| | | | 702/35 |
| 2019/0138670 A1* | 5/2019 | Bandara | G06F 30/20 |
| 2021/0262058 A1* | 8/2021 | Lu | G06F 30/23 |

FOREIGN PATENT DOCUMENTS

| | | |
|---|---|---|
| CN | 110399660 | 11/2019 |
| JP | 2019105897 | 6/2019 |

OTHER PUBLICATIONS

Written Opinion of the International Search Report in PCT/CN2020/079198, issued by ISA, dated Jun. 15, 2020.

\* cited by examiner

QUANTITATIVE MATCHING DESIGN METHOD FOR STRUCTURE HEAT TREATMENT-HARDNESS DISTRIBUTION

TECHNICAL FIELD

The invention relates to the field of structure hardness design in mechanical design, and is suitable for hardness design of black, colored and other metal mechanical structures and parts.

BACKGROUND

In the existing hardness distribution design of mechanical structures and parts, only dangerous section stress distribution is used for hardness matching design, and surface hardness, hardened layer depth and core hardness are obtained through analogy, experience and other methods. Therefore, in the design process of hardness distribution of mechanical parts, there is no quantitative theoretical and technical basis for the design and formulation of hardened layer depth and hardness gradient distribution of heat treatment, and there is no organic connection between the requirements of heat treatment process and the machining of mechanical parts, which leads to the failure of quantitative hardness matching design in the process of hardness design of mechanical structures and parts. The invention provides a concept of a intensity field, realizes a quantitative matching design method of structure heat treatment-hardness distribution, converts a stress field into an intensity field and then converts the intensity field into a hardness field, and obtains the actual hardness distribution of a dangerous section of the structure by combining material and heat treatment.

SUMMARY OF THE INVENTION

The technical problem to be solved by the present invention is: the hardness mismatch problem existing in the existing hardness design process of mechanical structures and parts according to an overall intensity viewpoint.

In order to solve the technical problem, the technical solution of the invention provides a quantitative matching design method for structure heat treatment-hardness distribution, comprising the following steps of:

step 1, determining a most dangerous limit static load possibly occurring in using process of a structure to be subjected to quantitative matching design for heat treatment-hardness distribution, and obtaining a highest static stress and a stress distribution in a static stress gradient direction at a dangerous section of a structure under the limit static load;

step 2, determining an ideal static intensity field distribution of the structure according to the highest static stress and the stress distribution in the static stress gradient direction obtained in step 1, wherein the static intensity at any point on the dangerous section of the structure is larger than a stress of the point, and designing an ideal intensity at any point on the dangerous section of a mechanical structure and a part as a fatigue stress amplitude of the point multiplied by a safety factor according to stress-intensity interference theory;

step 3, converting the ideal static intensity distribution of the dangerous section of the structure into the ideal hardness distribution of the dangerous section of the structure according to a corresponding conversion relation between the intensity and the hardness of a black or nonferrous metal or a corresponding relation between the intensity and the hardness obtained through tests;

step 4, taking the ideal hardness distribution of the dangerous section of the structure as a target, matching a material and a heat treatment mode of the structure, and adjusting a depth of a hardened layer, so that an actual surface hardness, an actual sub-surface hardness and an actual core hardness of the structure are all greater than or equal to an ideal target hardness of a corresponding point; and step 5, according to a hardness requirement of a surface hardness and a core hardness of the heat treatment of the structure, combining lowest hardness and highest hardness of end quenching of the material along a depth distribution curve, ensuring that an actual hardness of a whole field is greater than or equal to the ideal hardness by determining the depth of the hardened layer, and finally obtaining an actual hardness distribution of the dangerous section of the structure.

Preferably, in step 1, the highest static stress and the stress distribution in the static stress gradient direction at the dangerous section of the structure are calculated by using material mechanics or finite element method.

Preferably, in step 1, under a simple load, the highest static stress and the stress distribution in the static stress gradient direction are highest surface stress at the dangerous section of the structure and the stress distribution along a depth at the dangerous section of the structure.

Preferably, in step 2, the ideal intensity field is amplified in proportion to the highest static stress and the stress distribution in the static stress gradient direction.

Preferably, in step 4, if the actual core hardness is too high, a material with lower carbon content and surface carburization are adopted for adjustment, the actual sub-surface hardness being adjusted through the depth of the hardened layer, the actual surface hardness being increased by carburizing or increasing the depth of the hardened layer.

Compared with the traditional hardness distribution matching design method, the method of the present disclosure can actively perform local intensity matching according to materials, heat treatment and the like, solving the problem of local hardness surplus caused by local hardness mismatch due to original design according to the overall intensity viewpoint, and realizing quantitative matching design of hardness distribution of mechanical structures and parts.

DETAILED DESCRIPTION OF THE PREFERRED EMBODIMENTS

The invention will be further elucidated with reference to the drawings. It should be understood that these examples are merely illustrative of the invention and are not intended to limit the scope of the invention. In addition, it will be understood that various changes and modifications may be made by those skilled in the art in light of the teachings of this invention, and equivalents fall within the scope of the appended claims of the present application.

Figure 1:
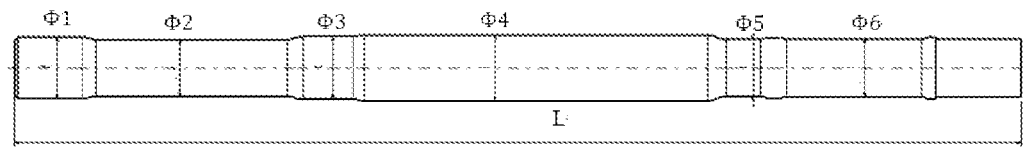
FIG. 1 is a solid axial dimension chart, in FIG. 1, $\phi 1=285$ mm, $\phi 2=26.5$ mm, $\phi 3=29.2$ mm, $\phi 4=30.5$ mm, $\phi 5=26.6$ mm, $\phi 6=27.1$ mm, L=468 mm.
Figure 2:
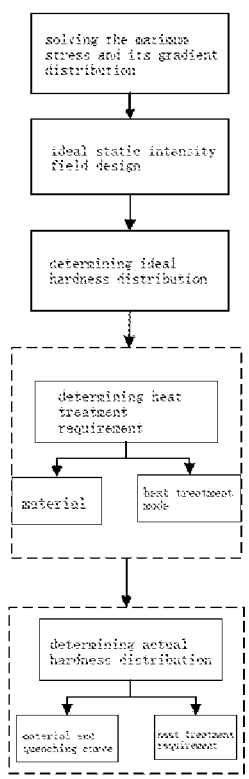
FIG. 2 is a flow chart of an implementation of the present invention.

The present embodiment takes a torsion of a solid shaft under a torsional load as an example. A material of the shaft is 40Cr steel, a minimum diameter of the shaft is 26.5 mm, a maximum diameter is 30.5 mm, and a length of the shaft is 468 mm. A limit torsional load experienced is 3500 Nm and dimensions are shown in FIG. 1. With reference to FIG. 2, the invention provides a quantitative matching design method for structure heat treatment-hardness distribution, comprising the following steps of:

1) Determining a highest static stress and a gradient distribution of a dangerous section of a structure under a limit static load;

The maximum static stress and the stress distribution in the gradient direction of the dangerous section of the structure are calculated by using material mechanics or finite element method under a most dangerous limit static load possibly occurring in using process of the structure. Under simple load, the highest static stress and its stress distribution in the gradient direction are highest surface stress of the dangerous section of the structure and the stress distribution along a depth there.

For this embodiment, a most dangerous limit torsional load is 3500 Nm. By using the material mechanics method, the dangerous section of the present embodiment has at an outer surface diameter of 26.5 mm with a lowest torsional modulus (i.e., a smallest diameter), and the highest stress is:

$$\tau_{max} = \frac{T}{W_t} = \frac{3500}{\frac{\pi \cdot (26.5 \times 10^{-3})^3}{16}} = 956 \, MPa \quad (1)$$

In formula (1), T is the torque, expressed in Nm; $W_t$ is the section modulus in torsion, expressed in m³.

A maximum gradient direction of a maximum static stress is an axis center pointed by an outer surface with the diameter of 26.5 mm, and the stress at any point of the cross section from the axis center is as follows:

$$\tau_y = \frac{Ty}{I_p} = \frac{3500 \cdot y}{\frac{\pi \cdot (26.5 \times 10^{-3})^4}{32}} = 72 \, yMPa \quad (2)$$

Figure 3:
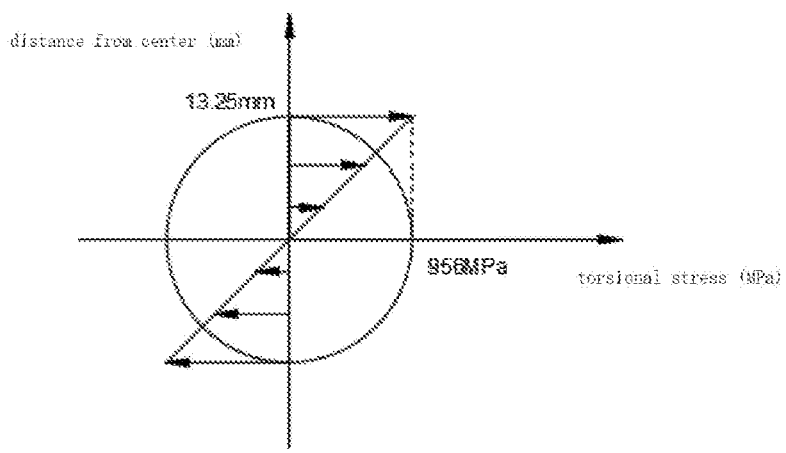
FIG. 3 shows a torsional stress distribution of a dangerous section.

In formula (2): Ty is torque, expressed in Nm; $I_p$ is a moment of inertia of a section pole, expressed in m⁴; y is a distance of the cross section from the axis center. The torsional stress distribution of the dangerous section calculated in this embodiment is shown in FIG. 3.

2) Determining an ideal static intensity distribution of the dangerous section of the structure according to the highest static stress and the gradient distribution thereof;

According to the highest static stress and the stress distribution in the static stress gradient direction under the limit static load in the using process of the structure, the ideal static intensity field distribution of the structure can be determined, and the ideal intensity field is amplified in proportion to the highest static stress and the gradient direction distribution thereof. The static intensity of any point on the dangerous section of the structure is greater than the stress of the point, and according to the stress-intensity interference theory, the ideal intensity of any point on the dangerous section of a mechanical structure and a part is designed as a fatigue stress amplitude of the point multiplied by a safety factor. The ideal static intensity distribution on the dangerous section of the mechanical structure and the part does not have excessive intensity, and a intensity utilization rate reaches the maximum.

Figure 4:
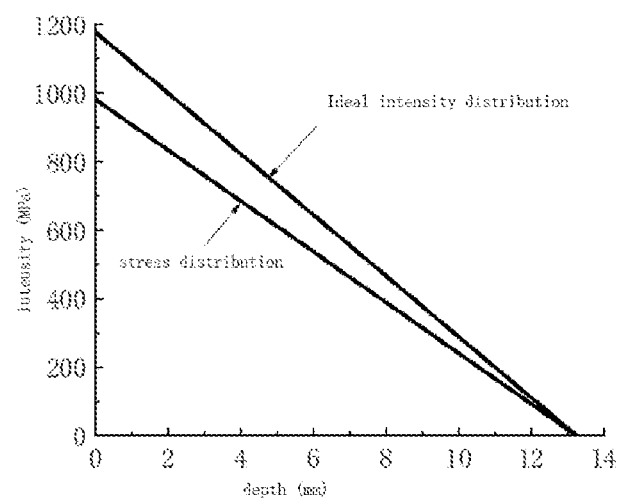
FIG. 4 shows torsional stress and ideal intensity distribution.

In this embodiment, the desired intensity design is such that the desired intensity at any point of the dangerous section of the structure is greater than the limit stress at that point, and the ratio of the desired intensity to the limit stress is a constant, which is a safety factor that is related to factors such as load, material properties, etc. In this case, the safety factor of the static intensity design is 1.2, and the ideal torsional intensity field distribution under the whole intensity is shown in FIG. 4. The limit stress distribution of the corresponding point is also provided in FIG. 4.

3) Determining the ideal hardness distribution of the dangerous section of the structure by utilizing the intensity-hardness conversion relation;

According to an intensity-hardness corresponding conversion relation of a black or nonferrous metal or an intensity-hardness corresponding relation obtained through tests, the ideal static intensity distribution of the dangerous section of the structure is converted into the ideal hardness distribution of the dangerous section of the structure.

In the embodiment, the ideal hardness distribution of the dangerous section of the structure can be obtained according to the designed ideal static intensity distribution of the structure, by using the intensity-hardness conversion relation and a third intensity theory, and the hardness of any point of the dangerous section can be obtained according to the ideal intensity of the point, as shown in formula (3):

$$H_d = \left(\frac{\tau_d - 350}{0.0064}\right)^{\frac{1}{2.88}} \quad (3)$$

Figure 5:
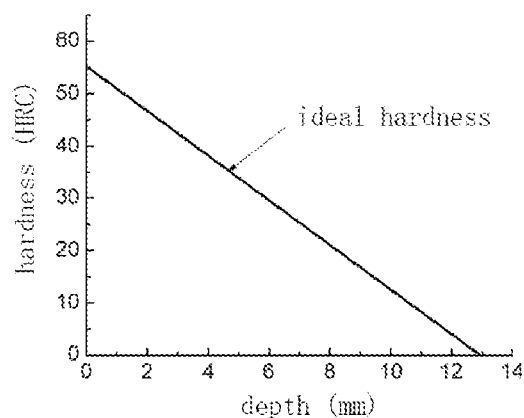
FIG. 5 shows an ideal hardness distribution along a depth of a dangerous section.

In formula (3), $\tau_d$ is a torsional intensity at a depth of point d, expressed in MPa; $H_d$ is hardness at a depth of point d, expressed in HRC. The ideal hardness distributed along the depth at any point of the dangerous section obtained from formula (3) is shown in FIG. 5.

4) The heat treatment requirements such as surface hardness, core hardness and the like are determined by combining material and heat treatment mode The heat treatment requirements of the structure include heat treatment mode, surface hardness, core hardness and other parameters. The ideal hardness distribution of the dangerous section is taken as a target, the material and the heat treatment mode of the structure are matched, and the depth of the hardened layer is adjusted, so that the actual surface hardness and core hardness of the structure are greater than or equal to the ideal target hardness of a corresponding point. If the core hardness is too high, materials with lower carbon content and surface carburization can be adopted; the sub-surface hardness can be adjusted through the depth of the hardened layer; and the surface hardness may be increased by carburization or by increasing the depth of the hardened layer.

In this embodiment, the ideal hardness distribution for the dangerous section is of a linear distribution with a surface hardness of 55 HRC and a core hardness of 0; the material of the present embodiment is acquired by matching with product process as 40Cr, and the heat treatment mode is medium-frequency quenching; and a minimum surface hardness is 55 HRC, and the core hardness is not more than 30 HRC.

5) According to a material end quenching curve and a heat treatment requirement, an actual hardness distribution of the dangerous section of the structure is determined According to the hardness requirement of the surface hardness and core hardness of the heat treatment of the structure, a lowest hardness and a highest hardness of the end quenching of the material are combined along a depth distribution curve, the actual hardness of a whole field is ensured to be greater than or equal to the ideal hardness by determining the depth of the hardened layer, and the actual hardness distribution of the dangerous section of the structure is finally obtained.

Figure 6:
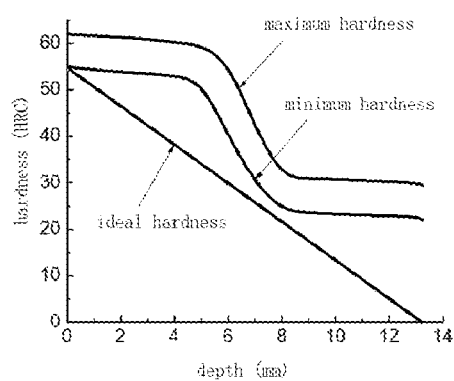
FIG. 6 shows an actual hardness distribution of a dangerous section of a structure.

The heat treatment mode of the embodiment is medium-frequency quenching, the minimum surface hardness is 55 HRC, the core hardness is not more than 30 HRC, and a lowest hardness and a highest hardness of the end quenching of the material are combined along a depth distribution curve. The actual hardness of the whole field is ensured to be greater than or equal to the ideal hardness by adjusting the depth of the hardened layer. Finally, the actual surface hardness of the dangerous section of the structure is determined to be 57-62 HRC, the depth of the hardened layer with the hardness of more than 50 HRC is determined to be 4.8-8 mm, the core hardness is not greater than 30 HRC, and the actual hardness distribution of the dangerous section of the structure is shown in FIG. 6.

The invention claimed is:

1. A quantitative matching design method for structure heat treatment-hardness distribution, comprising the following steps:

step 1, determining a most dangerous limit static load possibly occurring in using process of a structure to be subjected to quantitative matching design for heat treatment-hardness distribution, and obtaining a highest static stress and a stress distribution in a static stress gradient direction at a dangerous section of a structure under the limit static load;

step 2, determining an ideal static intensity field distribution of the structure according to the highest static stress and the stress distribution in the static stress gradient direction obtained in step 1, wherein the static intensity at any point on the dangerous section of the structure is larger than a stress of the point, and designing an ideal intensity at any point on the dangerous section of a mechanical structure and a part as a fatigue stress amplitude of the point multiplied by a safety factor according to stress-intensity interference theory;

step 3, converting the ideal static intensity distribution of the dangerous section of the structure into the ideal hardness distribution of the dangerous section of the structure according to a corresponding conversion relation between the intensity and the hardness of a black or nonferrous metal or a corresponding relation between the intensity and the hardness obtained through tests;

step 4, taking the ideal hardness distribution of the dangerous section of the structure as a target, matching a material and a heat treatment mode of the structure, and adjusting a depth of a hardened layer, so that an actual surface hardness, an actual sub-surface hardness and an actual core hardness of the structure are all greater than or equal to an ideal target hardness of a corresponding point; and step 5, according to a hardness requirement of a surface hardness and a core hardness of the heat treatment of the structure, combining lowest hardness and highest hardness of end quenching of the material along a depth distribution curve, ensuring that an actual hardness of a whole field is greater than or equal to the ideal hardness by determining the depth of the hardened layer, and finally obtaining an actual hardness distribution of the dangerous section of the structure.

2. The quantitative matching design method for structure heat treatment-hardness distribution according to claim 1, wherein, in step 1, the highest static stress and the stress distribution in the static stress gradient direction at the dangerous section of the structure are calculated by using material mechanics or finite element method.

3. The quantitative matching design method for structure heat treatment-hardness distribution according to claim 1, wherein, in step 1, under a simple load, the highest static stress and the stress distribution in the static stress gradient direction are highest surface stress at the dangerous section of the structure and the stress distribution along a depth at the dangerous section of the structure.

4. The quantitative matching design method for structure heat treatment-hardness distribution according to claim 1, wherein, in step 2, the ideal intensity field is amplified in proportion to the highest static stress and the stress distribution in the static stress gradient direction.

5. The quantitative matching design method for the structure heat treatment-hardness distribution according to claim 1, wherein, in step 4, if the actual core hardness is too high, a material with lower carbon content and surface carburization are adopted for adjustment, the actual sub-surface hardness being adjusted through the depth of the hardened layer, the actual surface hardness being increased by carburizing or increasing the depth of the hardened layer.

* * * * *